US012381057B2

(12) United States Patent
Whitney

(10) Patent No.: US 12,381,057 B2
(45) Date of Patent: Aug. 5, 2025

(54) EXPLOSION PROOF STARTER SOLENOID ARRANGEMENT FOR ENGINES

(71) Applicant: CLARKE FIRE PROTECTION PRODUCTS, INC., Cincinnati, OH (US)

(72) Inventor: John Whitney, Blanchester, OH (US)

(73) Assignee: Clarke Fire Protection Products, Inc., Cincinnati, OH (US)

(*) Notice: Subject to any disclaimer, the term of this patent is extended or adjusted under 35 U.S.C. 154(b) by 0 days.

(21) Appl. No.: 18/674,457

(22) Filed: May 24, 2024

(65) Prior Publication Data

US 2024/0420909 A1 Dec. 19, 2024

Related U.S. Application Data

(60) Provisional application No. 63/508,641, filed on Jun. 16, 2023.

(51) Int. Cl.

*H01H 50/18* (2006.01)
*F02N 11/08* (2006.01)
*H01H 50/54* (2006.01)

(52) U.S. Cl.

CPC ......... *H01H 50/18* (2013.01); *F02N 11/0862* (2013.01); *F02N 11/087* (2013.01); *H01H 50/54* (2013.01)

(58) Field of Classification Search

CPC .......... H01H 9/04; H01H 9/042; H01H 50/18; H01H 50/26; H01H 50/54; F02N 11/00;

(Continued)

(56) References Cited

U.S. PATENT DOCUMENTS 2,814,701 A * 11/1957 Rayer .................... H01H 9/042 200/302.1
3,134,056 A * 5/1964 Eberle .................. H01F 7/1607 335/260

(Continued)

FOREIGN PATENT DOCUMENTS

CA 558706 A 10/1958
CN 2572030 Y * 9/2003

(Continued)

OTHER PUBLICATIONS

DelcoRemy, Starting Motor Service Bulletin, Jan. 25, 2006, 10 pages.

(Continued)

*Primary Examiner* — John M Zaleskas
(74) *Attorney, Agent, or Firm* — THOMPSON HINE LLP

(57) ABSTRACT

Various implementations disclosed herein include devices, systems, and methods for implementing a starter system that utilizes multiple starter solenoids physically isolated from each other. For example, the system may include a first solenoid mechanically connected to a starter motor. The first solenoid may be configured to receive a first starting current signal and mechanically couple the starter motor with an engine. The system may further include a second solenoid mounted within an explosion proof structure physically isolating the second solenoid from the first solenoid and the starter motor. The system may further include a non-incendive circuit mounted within the explosion proof structure. The non-incendive circuit may be configured to indicate that the starter motor is coupled with the engine and signal the second solenoid for activation to supply a cranking current signal to windings of the starter motor for operation.

18 Claims, 7 Drawing Sheets

(58) Field of Classification Search
CPC ...... F02N 11/02; F02N 11/08; F02N 11/0862; F02N 11/087; F02N 11/10
See application file for complete search history.

(56) References Cited

U.S. PATENT DOCUMENTS

| | | | | |
|---|---|---|---|---|
| 3,276,288 | A * | 10/1966 | Fry | F16K 31/046 74/606 R |
| 11,136,827 | B2 | 10/2021 | Caron | |
| 2004/0017086 | A1 * | 1/2004 | Shiga | F02N 11/0851 290/38 R |
| 2007/0139146 | A1 * | 6/2007 | Kusumoto | F02N 11/087 335/131 |
| 2009/0206965 | A1 * | 8/2009 | Niimi | H01H 50/54 335/106 |
| 2010/0282200 | A1 | 11/2010 | Notani et al. | |
| 2011/0140813 | A1 * | 6/2011 | Suzuki | H01H 51/065 335/156 |
| 2011/0198862 | A1 * | 8/2011 | Yamada | F02N 11/087 310/68 R |
| 2012/0162847 | A1 * | 6/2012 | Suzuki | H01H 51/065 361/206 |
| 2013/0133605 | A1 | 5/2013 | Neet et al. | |
| 2019/0017619 | A1 * | 1/2019 | Gagliano | H02K 5/136 |
| 2022/0333712 | A1 * | 10/2022 | Kim | F02M 21/0293 |

FOREIGN PATENT DOCUMENTS

| | | | | |
|---|---|---|---|---|
| CN | 1542266 | A * | 11/2004 | |
| CN | 201047328 | Y * | 4/2008 | |
| CN | 201118324 | Y * | 9/2008 | |
| CN | 201273244 | Y * | 7/2009 | |
| CN | 201306241 | Y * | 9/2009 | |
| CN | 103001381 | A * | 3/2013 | |
| CN | 206111411 | U * | 4/2017 | |
| CN | 106803701 | A * | 6/2017 | |
| CN | 207348999 | U * | 5/2018 | |
| CN | 111058986 | A * | 4/2020 | F02N 11/00 |
| CN | 211082110 | U * | 7/2020 | F02N 11/00 |
| GB | 2517457 | A * | 2/2015 | F02N 15/00 |
| KR | 20060070676 | A * | 6/2006 | |
| WO | 2011/138936 | A1 | 11/2011 | |
| WO | WO 2019/217983 | A1 | 11/2019 | |

OTHER PUBLICATIONS

U.S. Patent and Trademark Office, International Search Report and Written Opinion, issued Dec. 16, 2024, which pertains to PCT Application No. PCT/US2024/031405. 10 pages.

* cited by examiner

EXPLOSION PROOF STARTER SOLENOID ARRANGEMENT FOR ENGINES

TECHNICAL FIELD

The present application relates generally a starter system that utilizes multiple starter solenoids physically isolated from each other.

BACKGROUND

Existing starter systems enable a cranking current signal to be directly applied to a starter motor to initialize a process for starting an engine. However, existing starter systems may not adequately account for the possibility of an ignition source spark occurring during application of a cranking current signal being applied to a starter thereby creating a potential fire hazard or explosion.

SUMMARY

Various implementations disclosed herein include devices, systems, and methods that implement an explosion proof starter system that utilizes multiple starter solenoids physically isolated from each other. The explosion proof starter system may be used for executing a multistep sequence associated with starting an engine. For example, the explosion proof starter system may be used to safely execute a sequence associated with starting any type of internal combustion engine including, inter alia, an engine in a vehicle (e.g., an automobile), an engine associated with an oil rig to drive fire pumps, mechanical equipment, generators that may be associated with an explosive atmosphere associated with flammable/explosive substances such as, inter alia, fuel, flammable chemicals, flammable gases, etc.

In some implementations, an explosion proof starter system is configured to operate such that when a starter switch (mechanical and/or electrical) is closed (e.g., to conduct an electrical signal), a starting current signal (e.g., between about 8-20 amps) may be delivered from a battery (e.g., 12 volts, 24 volts, etc.) to a starter-mounted solenoid (mounted to a starter motor) to linearly move a drive shaft, of the starter motor, to engage a pinion gear (on the drive shaft) with a flywheel of an engine. The starting current signal delivered to the starter-mounted solenoid may cause a contact disk, mounted to a plunger of the starter-mounted solenoid and electrically isolated from windings of the starter motor, to move in a linear direction to ground an isolated, low current non-incendive control circuit to signal that the pinion gear is engaged with the flywheel and to operate a starter motor energization solenoid for activation. In response to the starter motor energization solenoid being activated, a contact disk (of the starter motor energization solenoid) moves in a linear direction to conduct a cranking current signal (e.g., approximately 200 amps or more) directly to the windings of the starter motor to drive the starter motor to start the engine. The non-incendive circuit and the starter motor energization solenoid may be located within an explosion proof housing(s) thereby isolating any type of spark or ignition source that may occur during activation of the starter motor energization solenoid. Isolating the non-incendive circuit and the starter motor energization solenoid from the starter mounted solenoid may reduce an explosion risk issue due to the possible existence of flammable/explosive substances such as, inter alia, fuel, flammable chemicals, flammable gases, etc.

In some implementations, an explosion proof starter system includes: a battery and a first solenoid associated with a starter motor. The first solenoid is configured to receive a first starting current signal from the battery and, in response, move to a position so as to mechanically couple the starter motor with an engine. The first solenoid includes a first electrical contact and a second electrical contact and is configured to electrically connect the first electrical contact and the second electrical contact when the first solenoid moves to the position in which the starter motor is mechanically coupled to the engine. The explosion proof starter system may include at least one explosion proof structure enclosing: a second solenoid and a circuit. The first solenoid and the starter motor are located exterior to the at least one explosion proof structure. The second solenoid includes a third electrical contact and a fourth electrical contact. The fourth electrical contact is connected to windings of the starter motor. The circuit is electrically connected to the first electrical contact such that electrical connection of the first contact and the second contact causes a current flow through the first electrical contact and the second electrical contact. The circuit is configured such that, in response to the current flow, the circuit responsively causes delivery of a second starting current signal from the battery to the second solenoid for causing the second solenoid to move to a position to electrically connect the third contact and the fourth contact so as to supply a cranking current signal from the battery to windings of the starter motor to operate the starter motor.

In some implementations, an explosion proof starter system includes a first solenoid mechanically connected to a starter motor. The first solenoid is configured to receive a first starting current signal and in response, mechanically couple the starter motor with an engine. The explosion proof starter system further includes a second solenoid mounted within an explosion proof structure physically isolating the second solenoid from the first solenoid and the starter motor. The first solenoid and the starter motor are located exterior to the explosion proof structure. The explosion proof starter system further includes a non-incendive circuit mounted within the explosion proof structure. The non-incendive circuit is configured to receive, via the first solenoid, a signal indicating that the starter motor is mechanically coupled with the engine and in response provide a second starting current signal to the second solenoid for activation. The second solenoid, when activated, supplies a cranking current signal to windings of the starter motor to operate the starter motor. In some implementations, a method of operating an explosion proof starter system that includes a first solenoid mechanically connected to a starter motor and a second solenoid and a non-incendive circuit mounted within an explosion proof structure physically isolating the second solenoid from the first solenoid and the starter motor is provided. The method includes, in response to activating a switch, receiving by the first solenoid, a first starting current signal. The method further includes, in response to receiving the first starting current signal, mechanically coupling the starter motor with an engine. The method further includes, in response to mechanically coupling the starter motor with the engine, receiving, by the non-incendive circuit via the first solenoid, a signal indicating that the starter motor is mechanically coupled with the engine. The method further includes, in response said receiving the signal, providing a second starting current signal to the second solenoid for activation; and supplying, by the second solenoid when activated, a cranking current signal to windings of the starter motor to operate the starter motor.

In some embodiments, the evaluation whether a circuit is non-incendive is made according to UL121201, based upon all environments for which the equipment including the circuit is (i) intended to be used, (ii) approved for use and/or (iii) actually being used.

In accordance with some implementations, an enclosure structure includes an enclosure; a solenoid mounted to an interior portion of the enclosure; at least one battery contactor; an elongated member extending through a surface of the enclosure and mechanically connected to the battery contactor; and a handle connected to a portion of the elongated member located exterior to the enclosure, wherein the handle is configured to manually activate the battery contactor to activate the solenoid to supply a cranking current signal to windings of a starter motor to operate the starter motor.

The details of one or more embodiments are set forth in the accompanying drawings and the description below. Other features, objects, and advantages will be apparent from the description and drawings, and from the claims.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 2, including

DETAILED DESCRIPTION

Figure 1:
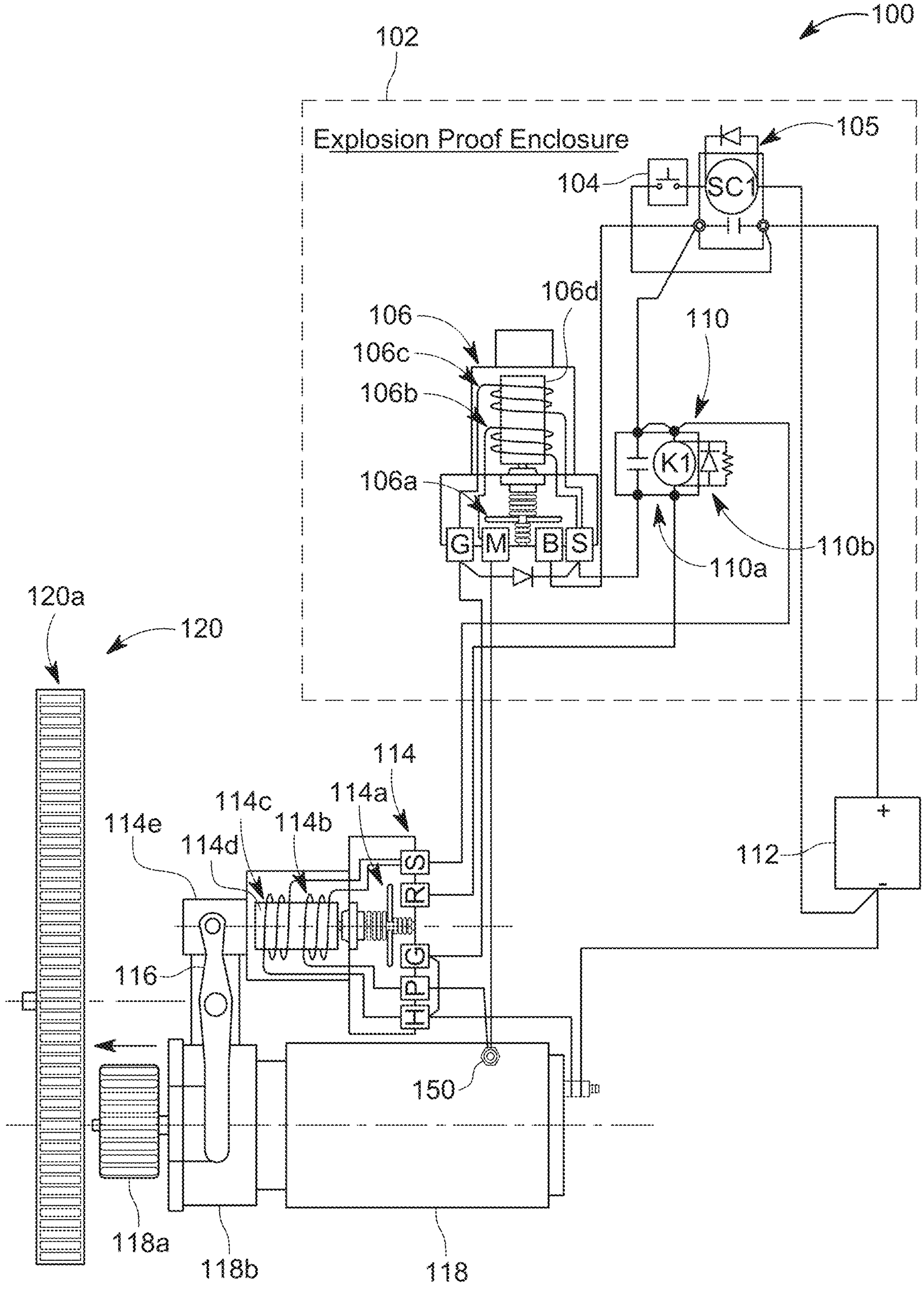
FIG. 1 is a schematic depiction of an explosion proof starter system, in accordance with some implementations.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 is a schematic depiction of an explosion proof starter system 100, in accordance with some implementations. The explosion proof starter system 100 comprises an explosion proof structure (e.g., an enclosure) 102, a solenoid 106, a solenoid 114, a non-incendive (crank control relay) circuit 110, a battery contactor 105, a switch 104, a starter motor 118, and a battery 112. Solenoid 114 comprises a starter mounted solenoid configured to cause (upon activation) a piston 114*e*, of solenoid 114, to activate a lever 116 to move a drive shaft 118*b* (of starter motor 118) in a linear direction (e.g., forward) to engage a pinion gear 118*a* with a flywheel 120*a* of an engine 120. Solenoid 106 comprises a starter motor energization solenoid configured to supply a cranking current signal (e.g., 24 Vdc at 200 or more amps) from battery 112 to starter motor windings 150 to cause starter motor 118 to activate and spin flywheel 120*a* to start engine 120. Battery 112 may comprise a single battery (e.g., 12 volt, 24 volt, etc.). Alternatively, battery 112 may comprise a plurality of interconnected batteries (e.g., 12 volt, 24 volt, etc.). A non-incendive circuit (e.g., non-incendive circuit 110) comprises circuitry that is not capable of producing an arc or thermal effect capable of igniting a flammable gas, vapor, dust, and/or air mixture.

Solenoid 106 may comprise a hold-in coil 106*c* and a pull-in coil 106*b* to operate a solenoid plunger 106*d* connected to a contact disk 106*a*. Solenoid 114 may comprise a hold-in coil 114*c* and a pull-in coil 114*b* to operate a solenoid plunger 114*d* connected to a contact disk 114*a* and a piston 114*c*. Contact disk 114*a* may be a silver-plated contact disk.

Engine 120 may comprise any type of internal combustion engine including, inter alia, an engine in a vehicle (e.g., an automobile), an engine associated with an oil rig to drive fire pumps, mechanical equipment, generators, etc. Likewise, engine 120 may comprise any type of internal combustion engine including, inter alia, an engine associated with usage at a land-based drilling site, a chemical plant, or any location that may be associated with an explosive atmosphere associated with flammable/explosive substances such as, inter alia, fuel, flammable chemicals, flammable gases, etc.

Solenoid 106, non-incendive circuit 110, battery contactor 105, and (starter) switch 104 may be positioned/placed within explosion proof structure 102. Explosion proof structure 102 is configured to physically isolate solenoid 106, non-incendive circuit 110, battery contactor 105, and switch 104 from solenoid 114, battery 112, starter motor 118, and engine 120. Explosion proof structure 102 may comprise a single structure (e.g., a metal box) configured to provide a physically isolating enclosure for solenoid 106, non-incendive circuit 110, battery contactor 105, and (starter) switch 104. Alternatively, explosion proof structure 102 may comprise multiple structures each configured to provide a physically isolating enclosure for at least one of solenoid 106, non-incendive circuit 110, battery contactor 105, and (starter) switch 104. Non-incendive circuit 110 is electrically connected to solenoid 114, solenoid 106, battery contactor 105, and battery 112. Non-incendive, circuit 110 is an electrically isolated, low current control circuit (e.g., enabling a current flow between about 400 milliamps to about 1.5 amps) that includes a (crank control) relay 110*a* and associated circuitry 110*b* configured to indicate that the pinion gear is engaged for activation of solenoid 106. Relay 110*a* may comprise any type of electrically operated switch comprising, inter alia, an electromagnetic coil to operate a mechanical switching mechanism. Alternatively, relay 110*a* may comprise any type of solid-state device such as, inter alia, a solid state relay comprising an electronic switch.

Solenoid 114 is configured to engage pinion gear 118*a* with flywheel 120*a* and transmit an isolated control signal (e.g., a ground signal) to non-incendive circuit 110. The control signal is configured to indicate that pinion gear 118*a* is engaged with flywheel 120*a* and is thereby in position to start engine 120. Therefore, solenoid 114 is constructed such that a contact disk 114*a* (within solenoid 114) is electrically isolated from starter motor windings 150 of starter motor 118. Likewise, solenoid 114 is electrically connected to non-incendive circuit 110 to operate relay 110*a*. A contact of the relay 110*a* may supply a starting current signal (e.g., about 8-20 amps) from battery 112 to operate solenoid 106. The starting current signal is configured to activate solenoid

106 to supply a cranking current signal (e.g., 200 or more amps), from battery 112, to starter motor windings 150 of starter motor 118 for operation of starter motor 118.

Explosion proof starter system 100 is configured to physically isolate solenoid 114 (configured to linearly move drive shaft 118*b* and pinion gear 118*a* forward to engage flywheel 120*a*) from solenoid 106 and non-incendive circuit 110 (within explosion proof structure 102) configured to deliver a cranking current signal to starter motor windings 150. Physically isolating solenoid 106 from solenoid 114 may prevent any type of spark event that may occur due to operation of solenoid 106 (with respect to a cranking current signal) from potentially causing an explosion risk due to flammable substances that may be present during operation of engine 120. An example process for enabling explosion proof starter system 100 to start engine 120 is described as follows:

The process is initiated when switch 104 is engaged. For example, a button may be manually engaged such that voltage/current is conducted across contacts of switch 104. In response, battery contactor 105 is activated to conduct and deliver a starting current signal (8-20 amps from battery 112) to solenoid 114 causing drive shaft 118*b* to move in a linear direction to engage pinion gear 118*a* with flywheel 120*a*. Additionally, delivering the starting current signal (from battery 112) to solenoid 114 causes contact disk 114*a* (electrically isolated from windings of starter motor 118) to move in a linear direction and electrically connect electrical contact G to an electrical contact R to provide a ground signal for the non-incendive circuit 110. In response, the grounded non-incendive circuit 110 energizes the relay 110*a* thereby providing a closed contact operating solenoid 106 for activation. In response to activation, contact disk 106*a* moves in a linear direction to close its contacts (B and M) enabling solenoid 106 to conduct and deliver a cranking current signal to the windings of starter motor 118 to drive the starter motor 118 and start the engine 120.

Figure 2A:
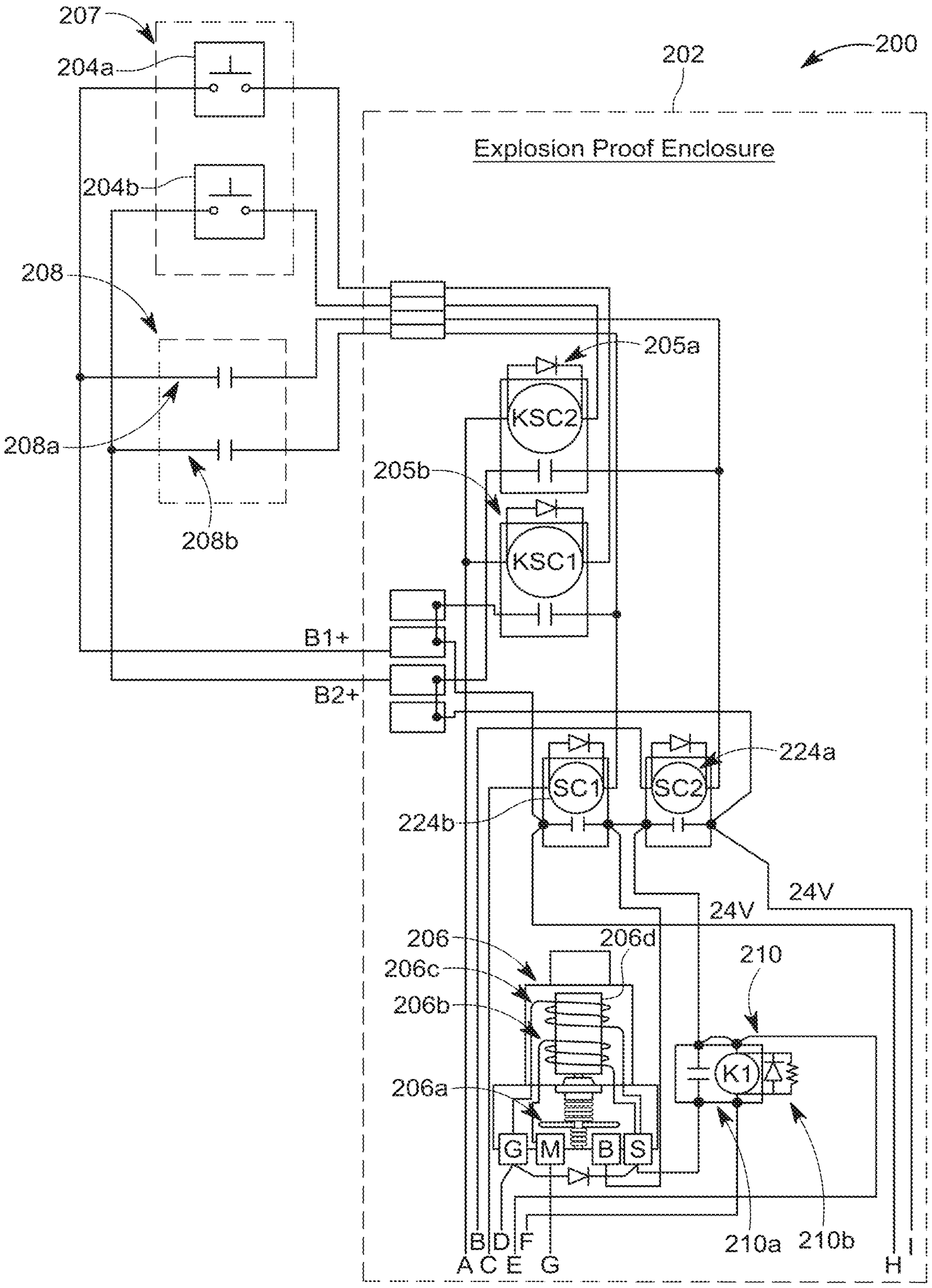
FIGS. 2A and 2B, is a schematic depiction of an explosion proof starter system comprising manual redundancy features, in accordance with some implementations.
Figure 2B:
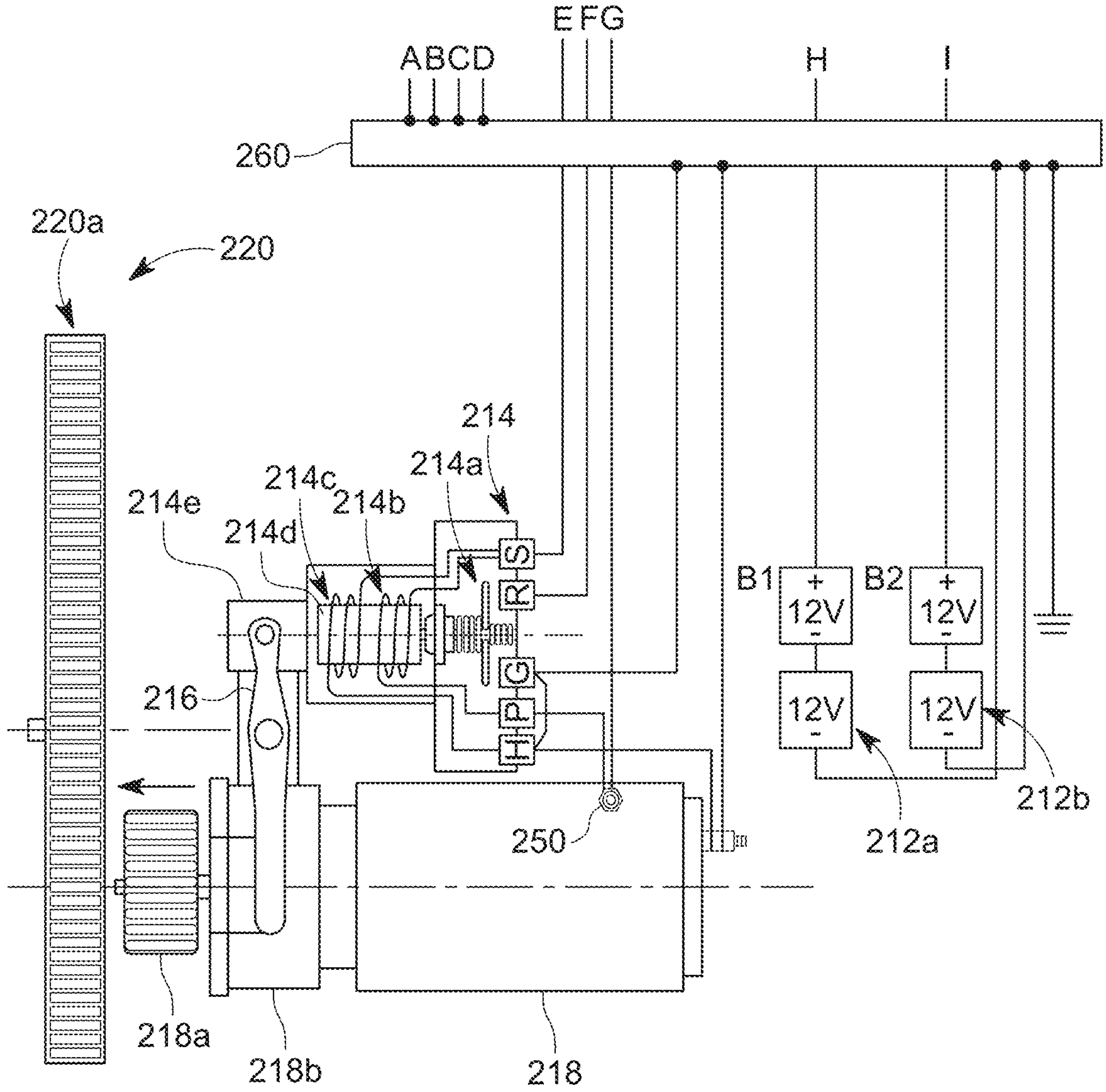

FIG. 2, including FIGS. 2A and 2B, is a schematic depiction of an explosion proof starter system 200 comprising manual redundancy features, in accordance with some implementations. The explosion proof starter system 200 comprises an explosion proof structure (enclosure) 202, a solenoid 206, a solenoid 214, a non-incendive (crank control relay) circuit 210, crank contactors 224*a* and 224*b*, a hazardous location rated engine instrument panel 207 comprising switches 204*a* and 204*b*, a hazardous location rated fire pump controller 208 comprising relay contacts 208*a* and 208*b*, a starter motor 218, and batteries 212*a* and 212*b*. Solenoid 214 comprises a starter mounted solenoid configured to cause (upon activation) a piston 214*e*, of solenoid 214, to activate a lever 216 to move a drive shaft 218*b* (of starter motor 218) in a linear direction (e.g., forward) to engage a pinion gear 218*a* with a flywheel 220*a* of an engine 220. Solenoid 206 comprises a starter motor energization solenoid configured to supply a cranking current signal (e.g., 24 Vdc at 200 or more amps) from battery 212*a* and/or 212*b* to starter motor windings 250 to cause starter motor 218 to activate and spin flywheel 220*a* to start engine 220. Each of batteries 212*a* and 212*b* may comprise a single battery (e.g., 12 volt, 24 volt, etc.). Alternatively, each of batteries 212*a* and 212*b* may comprise a plurality of interconnected batteries (e.g., 12 volt, 24 volt, etc.).

Solenoid 206 may comprise a hold-in coil 206*c* and a pull-in coil 206*b* to operate a solenoid plunger 206*d* connected to a contact disk 206*a*. Solenoid 214 may comprise a hold-in coil 214*c* and a pull-in coil 214*b* to operate a solenoid plunger 214*d* connected to a contact disk 214*a* and a piston 214*c*. Contact disk 214*a* may be a silver-plated contact disk.

Engine 220 may comprise any type of internal combustion engine including, inter alia, an engine in a vehicle (e.g., an automobile), an engine associated with an oil rig to drive fire pumps, mechanical equipment, generators, etc. Likewise, engine 220 may comprise any type of internal combustion engine including, inter alia, an engine associated with usage at a land-based drilling site, a chemical plant, or any location that may be associated with an explosive atmosphere associated with flammable/explosive substances such as, inter alia, fuel, flammable chemicals, flammable gases, etc.

Solenoid 206, non-incendive circuit 210, crank contactors 224*a* and 224*b*, and KSC crank contactors 205*a* and 205*b* may be positioned/placed within explosion proof structure 202. Explosion proof structure 202 is configured to physically isolate solenoid 206, non-incendive circuit 210, crank contactors 224*a* and 224*b*, and KSC crank contactors 205*a* and 205*b* from solenoid 214, batteries 212*a* and 212*b*, starter motor 218, and engine 220. Explosion proof structure 202 may comprise a single structure (e.g., a metal box) configured to provide a physically isolating enclosure for solenoid 206, non-incendive circuit 210, battery crank contactors 224*a* and 224*b*, and KSC crank contactors 205*a* and 205*b*. Alternatively, explosion proof structure 202 may comprise a multiple structures each configured to provide a physically isolating enclosure for at least one of solenoid 206, non-incendive circuit 210, battery crank contactors 224*a* and 224*b*, and KSC crank contactors 205*a* and 205*b*. Non-incendive circuit 210 is electrically connected to solenoid 214, (cranking) solenoid 206, crank contactors 224*a* and 224*b*, and batteries 212*a* and 212*b*. Non-incendive low current circuit 210 comprises a (crank control) relay 210*a* and associated circuitry 210*b* configured to activate solenoid 206. Relay 210*a* may comprise any type of electrically operated switch comprising, inter alia, an electromagnetic coil to operate a mechanical switching mechanism. Alternatively, relay 210*a* may comprise any type of solid-state device such as, inter alia, a solid-state relay comprising an electronic switch.

Solenoid 214 is configured to engage pinion gear 218*a* with flywheel 220*a* and transmit an isolated control signal (e.g., a ground signal from a ground bus 260) to non-incendive circuit 210. The control signal is configured to indicate that pinion gear 218*a* is engaged with flywheel 220*a* and is thereby in position to start engine 220. Therefore, solenoid 214 is constructed such that a contact disk 214*a* (within solenoid 214) is electrically isolated from starter motor windings 250 of starter motor 218. Likewise, solenoid 214 is electrically connected to non-incendive circuit 210 to operate relay 210*a*. A contact of the relay 210*a* supplies a starting current signal (e.g., about 8-20 amps) from battery 212*a* and/212*b* to operate solenoid 206. The starting current control signal is configured to activate solenoid 206 to supply a cranking current signal (e.g., 200 or more amps), from batteries 212*a* and/or 212*b*, to starter motor windings 250 of starter motor 218 for operation of starter motor 218.

Figure 3A:
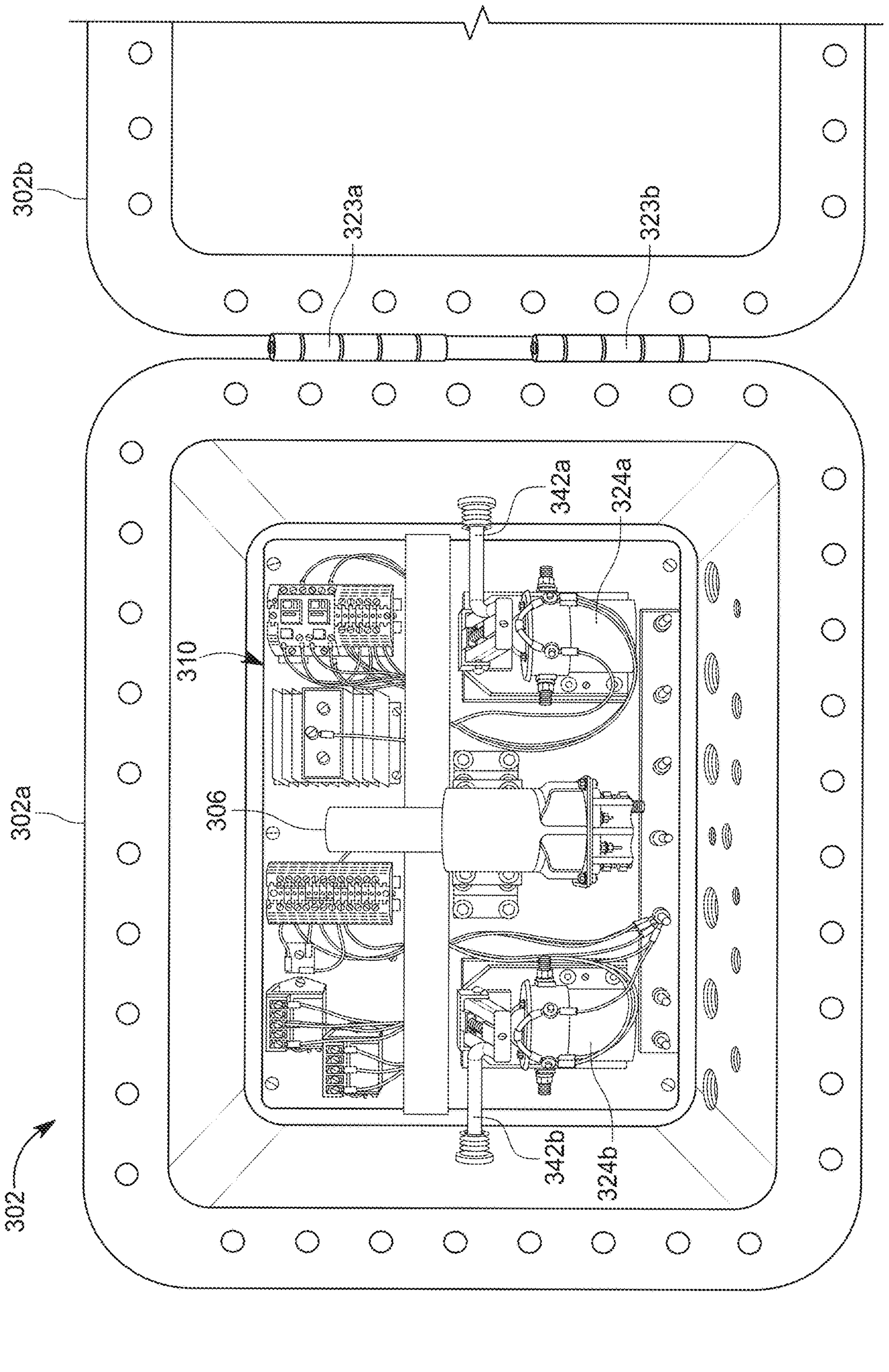
FIGS. 3A-3C illustrate views of an explosion proof structure, in accordance with some implementations.
Figure 3B:
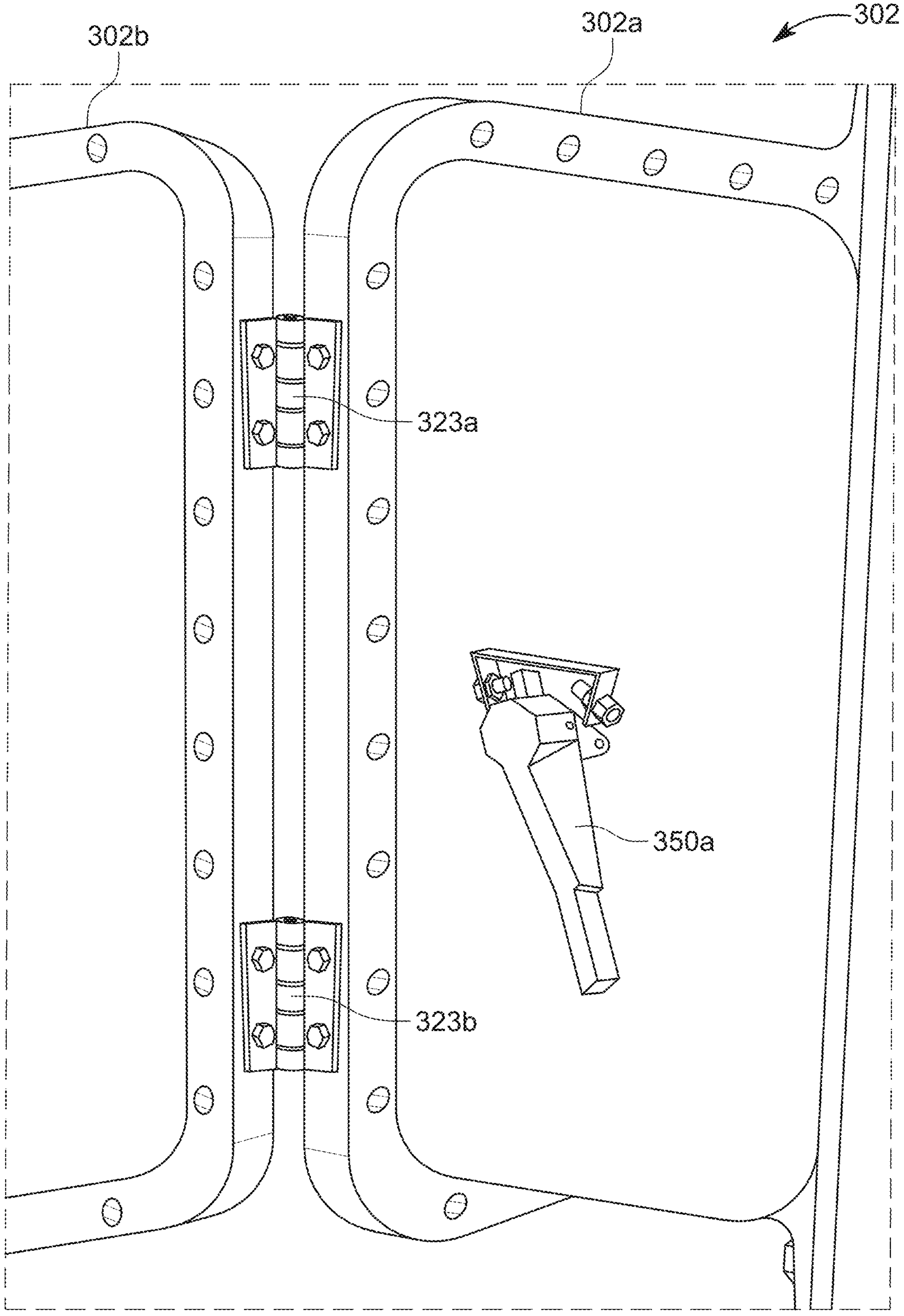

Explosion proof starter system 200 is configured to physically isolate solenoid 214 (configured to linearly move drive shaft 218*b* and pinion gear 218*a* forward to engage flywheel 220*a*) from solenoid 206 and non-incendive circuit 210 (within explosion proof structure 202) configured to deliver a cranking current signal to starter motor windings 250. Physically isolating solenoid 206 from solenoid 214 may prevent any type of spark event that may occur due to operation of solenoid 206 (with respect to a cranking current signal) from potentially causing an explosion risk due to flammable substances that may be present during operation of engine 220. An example process for enabling explosion proof starter system 200 to manually start engine 220 is described as follows:

A process for manually cranking starter motor 218 via battery 212*a* and/or 212*b* comprises manually engaging normally-open switches 204*a* and/or 204*b* (e.g., crank push-buttons, manual levers as described with respect to FIGS. 3A and 3B, etc.) to energize solenoid 214 thereby initiating a starting sequence. Starter motor 218 may be automatically cranked via battery 212*a* and/or 212*b* in response to a command initiated by hazardous location rated fire pump controller 208 comprising relay contacts 208*a* and 208*b*. The process further comprises activating battery contactors 224*a* and/or 224*b* to conduct and deliver a starting current signal (from battery 212*a* and/or 212*b*) to solenoid 214 causing drive shaft 218*b* to move in a linear direction to engage pinion gear 218*a* with flywheel 220*a*. Additionally, delivering the starting current signal (e.g., about 8-20 amps from battery 212*a* and/or 212*b*) to solenoid 214 causes contact disk 214*a* (electrically isolated from windings of starter motor 218) to move in a linear direction and electrically connect an electrical contact G and an electrical contact R to provide a ground signal for the non-incendive circuit 210. In response, the grounded non-incendive circuit 210 energizes the relay 210*a* thereby providing a closed contact operating solenoid 206 for activation. In response to activation, contact disk 206*a* moves in a linear direction to close its contacts (B and M) enabling solenoid 206 to conduct and deliver a cranking current signal to the windings of starter motor 218 to drive the starter motor 218 and start the engine 220.

Figure 3C:
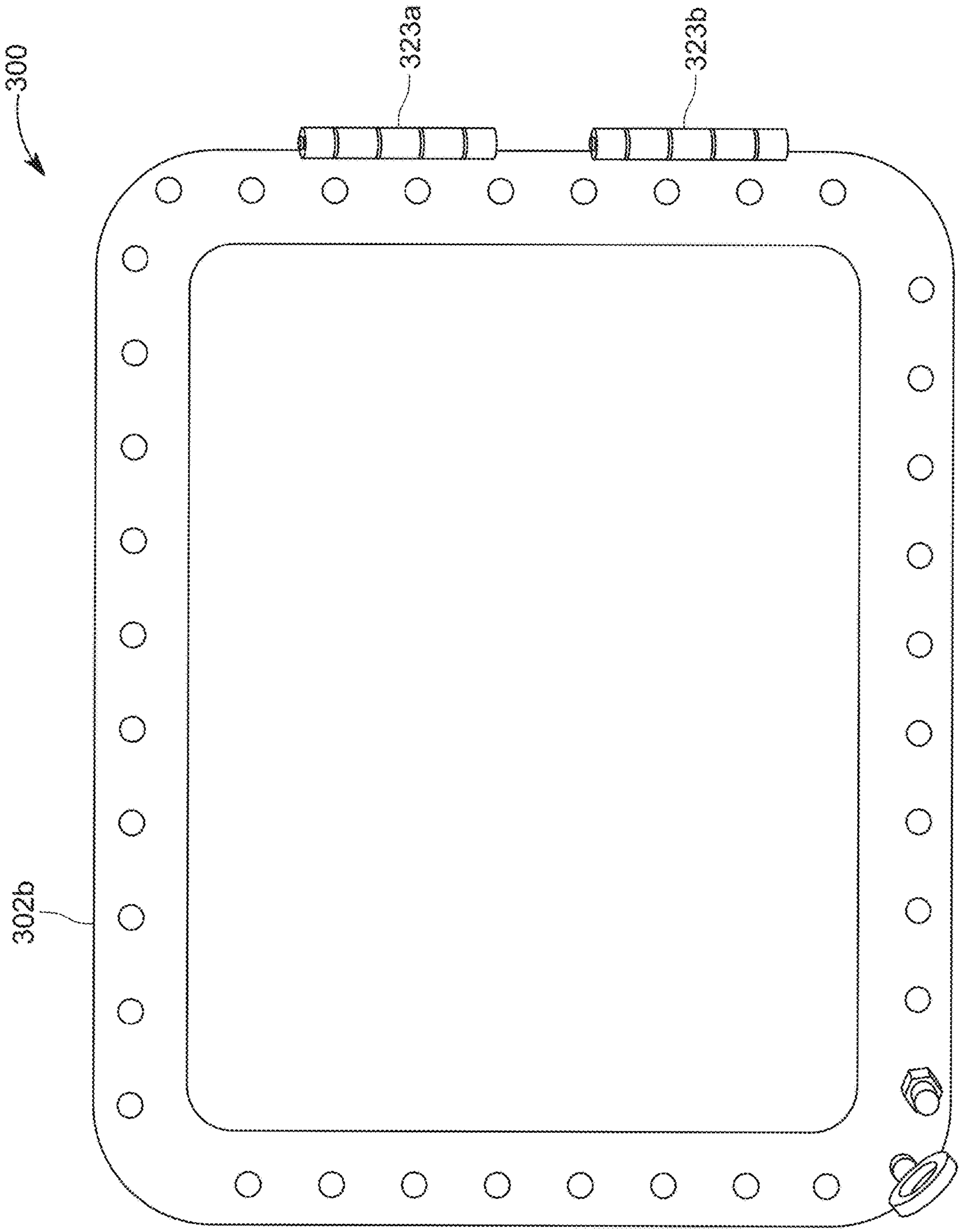

FIGS. 3A-3C illustrate views of an explosion proof structure 302, in accordance with some implementations.

FIG. 3A illustrates a front view of explosion proof structure 302 comprising an enclosure portion 302*a* attached to a (open) door 302*b* via hinges 323*a* and 323*b*. Enclosure portion 302*a* in combination with door 302*b* provides an explosion proof/fireproof structure for housing a starter motor energization solenoid 306, a non-incendive circuit 310, and battery contactors 324*a* and 324*b* to physically isolate starter motor energization solenoid 306, non-incendive circuit 310, and battery contactors 324*a* and 324*b* from a starter mounted solenoid, starting batteries, a starter motor, and an engine as described, supra, with respect to FIGS. 1 and 2, supra. The view of explosion proof structure 302 in FIG. 3A additionally illustrates levers 342*a* and 342*b* (e.g., elongated members) for manually engaging battery contactors 324*a* and 324*b*, respectively to cause current flow from a battery for activating a starter motor to start an engine. Levers 342*a* and 342*b* may extend from an area external to enclosure proof structure 302 through a side wall(s) of the enclosure portion 302*a* to an interior portion of enclosure portion 302*a*. Levers 342*a* and 342*b* are mechanically connected to battery contactors 324*a* and 324*b*, respectively. Levers 342*a* and 342*b* may comprise a cylindrical shaft type shape. Levers 342*a* and 342*b* may be mechanically connected to handles for enabling manual activation as described with respect FIG. 3B, infra. Explosion proof structure 302 may comprise any type of material capable of providing explosion and fire resistant properties. For example, explosion proof structure 302 may include, inter alia, a metallic material, etc.

FIG. 3B illustrates a side view of enclosure portion 302*a* attached to door 302*b* via hinges 323*a* and 323*b*. The side view of FIG. 3 illustrates a handle 350*a* attached to an exterior portion of lever 342*a* (illustrated in FIG. 3A). Handle 350*a* is configured to allow a user to manually operate lever 342*a* to manually engage battery contactor 324*a* to cause current flow from a battery for activating a starter motor to start an engine. Likewise, a handle (not illustrated in FIG. 3B) may be attached to an exterior portion (e.g., on an opposite side of enclosure portion 302*a*) of lever 342*b* (illustrated in FIG. 3A) to allow a user to manually operate lever 342*b* to manually engage battery contactor 324*b* to cause current flow from a battery for activating a starter motor to start an engine.

FIG. 3C illustrates a front view of door 302*b* in a closed position with respect to enclosure portion 302*a* thereby causing explosion proof structure 302 to retain explosion proof/fire proof properties.

Figure 4:
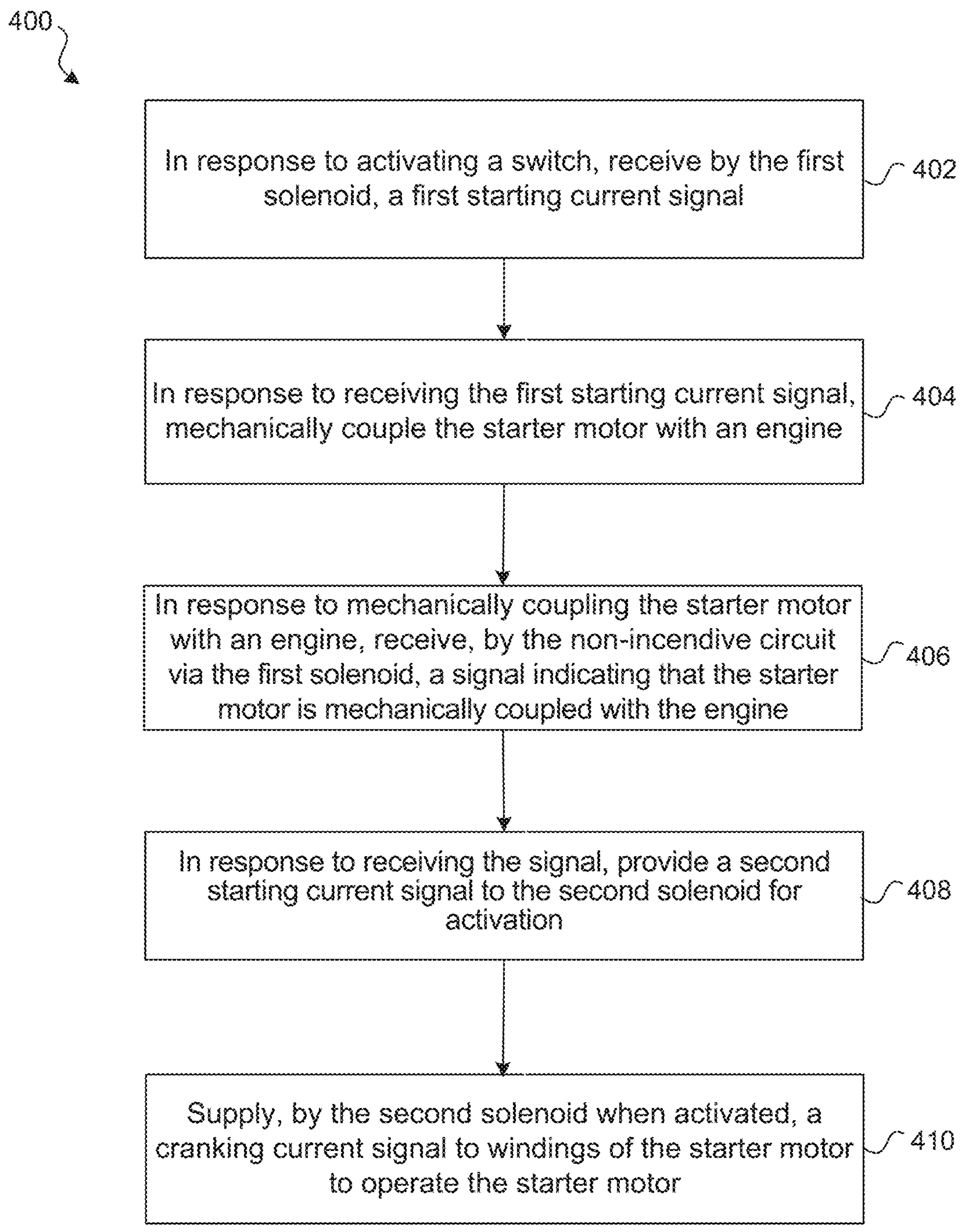
FIG. 4 is a flowchart representation of an exemplary method for operation of an explosion proof starter system, in accordance with some implementations.

FIG. 4 is a flowchart representation of an exemplary method 400 for operation of an explosion proof starter system, in accordance with some implementations.

In some implementations, the method 400 is performed by a device(s) or combination of devices, such as e.g., solenoid 106, solenoid 114, non-incendive (crank control relay) circuit 110, battery contactor 105, switch 104, starter motor 118, and battery 112 of FIG. 1. In some implementations, the method 400 is performed by processing logic, including hardware, firmware, software, or a combination thereof. In some implementations, the method 400 is performed by a processor executing code stored in a non-transitory computer-readable medium (e.g., a memory). Each of the blocks in the method 400 may be enabled and executed in any order.

At block 402, the method 400, in response to activating a switch, receives (by a first solenoid from a battery) a first starting current signal. The first starting current signal may be initially supplied to the first solenoid by a battery(s).

At block 404, in response to receiving the first starter current signal, a starter motor with is mechanically coupled with an engine. In some implementations, mechanically coupling the starter motor with the engine may include moving a drive shaft (of the starter motor) linearly forward to engage with the engine. For example, the first solenoid may be a starter mounted solenoid that causes (upon activation) a piston (of the first solenoid) to activate a lever (connected between the first solenoid and the drive shaft of the starter motor) to move the drive shaft in a linear direction (e.g., forward) to engage a pinion gear (mechanically coupled to the drive shaft) with a flywheel of an engine.

At block 406, in response to mechanically coupling the starter motor with the engine, a signal (e.g., a ground signal) is received by a non-incendive circuit via the first solenoid. The signal may indicate that the starter motor is mechanically coupled with the engine.

At block 408, in response said receiving the signal, a second starting current signal is provided to the second solenoid for activation. In some implementations, the first solenoid includes a contact element electrically isolated from field windings of the starter motor and electrically and operationally connected to a relay of the non-incendive circuit. The contact element of the first solenoid may be configured to provide the signal to the non-incendive circuit to activate the relay to provide the second starting current signal to the second solenoid. At block 410, in response to being activated, the second solenoid supplies a cranking current signal to windings of the starter motor to operate the starter motor.

The flowchart and block diagrams in the Figs illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figs. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. An explosion proof starter system, comprising:
a battery;
a starter motor;
an engine;
a first solenoid associated with the starter motor, wherein the first solenoid is configured to receive a first starting current signal from the battery and, in response, move to a position so as to mechanically couple the starter motor with the engine, the first solenoid including a first electrical contact and a second electrical contact and configured to electrically connect the first electrical contact and the second electrical contact when the first solenoid moves to the position in which the starter motor is mechanically coupled to the engine;
a second solenoid including a third electrical contact and a fourth electrical contact, the fourth electrical contact electrically connected to windings of the starter motor;
a circuit electrically connected to the first electrical contact such that electrical connection of the first electrical contact and the second electrical contact causes a current flow through the first electrical contact and the second electrical contact, the circuit configured such that, in response to the current flow, the circuit responsively causes delivery of a second starting current signal from the battery to the second solenoid for causing the second solenoid to move to a position to electrically connect the third electrical contact and the fourth electrical contact so as to supply a cranking current signal from the battery to windings of the starter motor to operate the starter motor; and
at least one explosion proof structure in which both the second solenoid and the circuit are located, wherein each of the engine, the first solenoid and the starter motor are located exterior to the at least one explosion proof structure.

2. The explosion proof starter system of claim 1, wherein the circuit is configured such that the current flow through the first electrical contact and the second electrical contact is less than 1 A.

3. The explosion proof starter system of claim 1, wherein the circuit is configured such that the current flow through the first electrical contact and the second electrical contact is less than 500 mA.

4. The explosion proof starter system of claim 1, wherein the circuit is configured to limit the current flow through the first electrical contact and the second electrical contact to a non-incendive level.

5. The explosion proof starter system of claim 1, wherein the circuit comprises a relay that closes, in response to the current flow through the first electrical contact and the second electrical contact, so as to deliver the second starting current signal from the battery to the second solenoid.

6. The explosion proof starter system of claim 1, wherein the first electrical contact and the second electrical contact are electrically isolated from windings of the starter motor.

7. An explosion proof starter system comprising:
a first solenoid mechanically connected to a starter motor, wherein the first solenoid is configured to receive a first starting current signal and in response, mechanically couple the starter motor with an engine;
an explosion proof structure;
a second solenoid located within the explosion proof structure physically isolating the second solenoid from the first solenoid and the starter motor, wherein the first solenoid and the starter motor are located exterior to the explosion proof structure; and
a circuit located within the explosion proof structure, wherein the circuit is configured to receive, via the first solenoid, a signal indicating that the starter motor is mechanically coupled with the engine and in response provide a second starting current signal to the second solenoid for activation, and wherein the second solenoid, when activated, supplies a cranking current signal to windings of the starter motor to operate the starter motor.

8. The explosion proof starter system of claim 7, wherein the first solenoid comprises a contact element electrically isolated from field windings of the starter motor.

9. The explosion proof starter system of claim 8, wherein the contact element of the first solenoid is a silver-plated contact.

10. The explosion proof starter system of claim 7, further comprising a switch and an electrical contactor, wherein the first solenoid is configured to receive the first starting current signal in response to activating the switch to enable the electrical contactor to electrically connect a battery to the first solenoid.

11. The explosion proof starter system of claim 7, wherein the second solenoid, when activated, supplies the cranking current signal, from a battery, to the windings of the starter motor to operate the starter motor.

12. The explosion proof starter system of claim 7, further comprising: an electrical contactor, wherein the first solenoid is configured to receive the first starting current signal in response to manually activating the electrical contactor to electrically connect a battery to the first solenoid.

13. The explosion proof starter system of claim 7, wherein the explosion proof structure comprises a metallic material.

14. The explosion proof starter system of claim 7, wherein the explosion proof structure comprises a door operable to provide access to an interior portion of the explosion proof structure.

15. The explosion proof starter system of claim 7, wherein the signal from the first solenoid to the circuit is triggered by electrical connection of a pair of electrical contacts of the first solenoid when the first solenoid moves to an engine start position and the circuit is configured such that the signal delivered through the pair of electrical contacts is less than 1.5 A.

16. The explosion proof starter system of claim 7, wherein the signal from the first solenoid to the circuit is triggered by electrical connection of a pair of electrical contacts of the first solenoid when the first solenoid moves to an engine start position and the circuit is configured such that the signal delivered through the pair of electrical contacts is non-incendive.

17. A method comprising:

at an explosion proof starter system having a first solenoid mechanically connected to a starter motor, a second solenoid mounted within an explosion proof structure physically isolating the second solenoid from the first solenoid and the starter motor, and a non-incendive circuit mounted within the explosion proof structure:

in response to activating a switch, receiving by the first solenoid, a first starting current signal;

in response to said receiving the first starting current signal, mechanically coupling the starter motor with an engine;

in response to said mechanically coupling, receiving, by the non-incendive circuit via the first solenoid, a signal indicating that the starter motor is mechanically coupled with the engine;

in response said receiving the signal, providing a second starting current signal to the second solenoid for activation; and supplying, by the second solenoid when activated, a cranking current signal to windings of the starter motor to operate the starter motor.

18. The method of claim 17, wherein the first starting current signal is initially supplied to the first solenoid by a battery.

* * * * *